United States Patent [19]
Kotras

[11] 3,755,776
[45] Aug. 28, 1973

[54] VEHICLE OPERATION INHIBITOR CONTROL SYSTEM

[75] Inventor: William A. Kotras, Milwaukee, Wis.

[73] Assignee: General Motors Corporation, Detroit, Mich.

[22] Filed: Apr. 7, 1972

[21] Appl. No.: 241,964

[52] U.S. Cl. .................. 340/53, 340/63, 340/279, 317/134, 180/99
[51] Int. Cl. ............................................. B60r 25/04
[58] Field of Search ............... 340/52 R, 53, 56, 340/63, 64, 223, 279; 200/42 R, 43; 180/99; 307/10 AT; 317/134, 137

[56] References Cited
UNITED STATES PATENTS

| | | | |
|---|---|---|---|
| 3,611,287 | 10/1971 | Hoff | 340/63 |
| 3,691,396 | 9/1972 | Hinrichs | 317/134 X |
| 3,659,154 | 4/1972 | Finn | 317/134 |
| 3,544,804 | 12/1970 | Gaumer et al. | 317/134 X |
| 3,665,447 | 5/1972 | Bidwell et al. | 180/99 X |

*Primary Examiner*—Alvin H. Waring
*Attorney*—Eugene W. Christen, Albert F. Duke et al.

[57] ABSTRACT

A control system for inhibiting vehicle operation until the vehicle operator has performed a physiological test includes a read-only memory which stores a plurality of preselected multidigit numbers. The various locations in the memory are continuously sequentially addressed until operator initiation of a SET pushbutton from a keyboard unit. The location in memory being addressed at the time of actuation of the SET pushbutton is displayed on a display unit for a predetermined interval of time. After the time interval has expired the displayed number must be entered into a comparator by the operator from a keyboard unit in order to start the vehicle. If the number is incorrectly entered or not entered within a predetermined time the operator may select another number from memory by actuating the SET pushbutton. After three consecutive unsuccessful attempts, however, the system is disabled for a thirty minute period. In addition to the primary task a divided attention task is incorporated in the system which requires the operator to perform an unrelated task such as actuation of the brake pedal during the tiee the number is being entered at the keyboard unit. Failure of either the primary or divided attention task prevents operation of the vehicle. The invention further includes apparatus for selecting a predetermined location in memory which is not displayed but must be entered through the keyboard unit by the operator before the primary or divided attention task can be performed. The code number stored in the predetermined location is known only to the owner of the vehicle. Means are provided for bypassing the primary and divided attention task to permit vehicle operation after the correct code number has been inserted. However, when the bypass mode is selected by the operator the vehicle's hazard warning s;ystem is actuated to indicate that the primary and divided attention task have not been performed.

7 Claims, 4 Drawing Figures

VEHICLE OPERATION INHIBITOR CONTROL SYSTEM

This invention relates to vehicle operation inhibitor control systems and more particularly to a system which inhibits vehicle operation until the operator has performed certain tests to establish his authority and physiological capability to operate the vehicle.

It is an object of the present invention to provide an improved system for inhibiting operation of a motor vehicle by an incapacitated person.

It is another object of the present invention to provide a system as aforementioned including physiological test apparatus comprising means for randomly generating a multidigit number which is displayed for a predetermined interval of time and must be properly entered into a keyboard unit before the vehicle may be started.

It is another object of the present invention to provide a physiological tester as aforementioned which includes a read-only memory which is programmed to store a plurality of preselected multidigit numbers and means for selecting at random one of the numbers stored in memory for display to thereby insure a more accurate test of the physiological capabilities of the operator of the motor vehicle.

It is a further object of the present invention to provide a physiological tester as aforementioned wherein a multidigit number known only to the owner of the vehicle is stored at a predetermined location in memory which is addressed upon an attempt to operate the vehicle and must be entered by the operator into the tester before the physiological test can be performed to thereby prevent unauthorized operation of the vehicle.

These and other objects and advantages of the present invention will be more apparent from the following detailed description which should be read in conjunction with the drawings in which.

Figure 1:
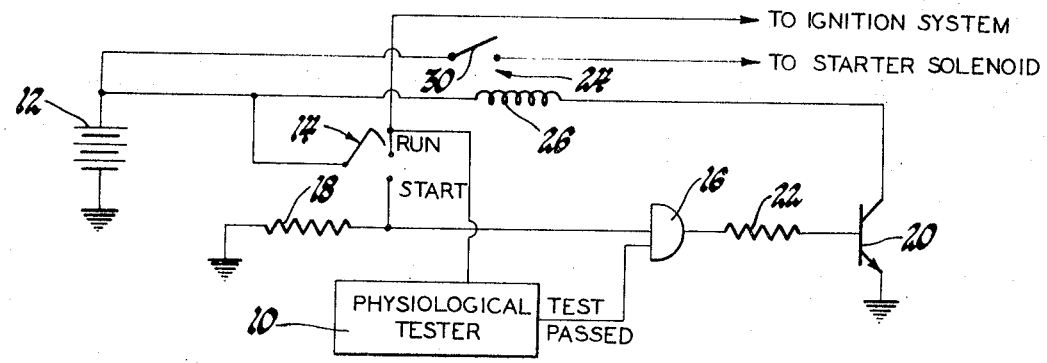
FIG. 1 is a schematic diagram of the control system of the present invention.

Referring now to the drawings and initially to FIG. 1 the physiological tester of the present invention is designated 10 and is connected with a source of direct current potential such as the vehicle battery 12 through an ignition switch 14. The ignition switch 14 is movable from a normally open position to a Run position and is spring biased to return to the Run position from a Start position. An AND gate 16 has one of its inputs connected with the output of the physiological tester 10 while the other input is connected to ground through a resistor 18 and with the battery 12 to the ignition switch 14 when in the Start position. The gate 16 controls a transistor 20 having its emitter grounded and its base connected to the output of the AND gate 16 through a resistor 22. The transistor 20 controls a relay generally designated 24. The relay 24 comprises a relay coil 26 and a normally open contact 30. The relay coil 26 is connected between the battery 12 and the collector of transistor 20. The ignition system of a vehicle is connected to the battery 12 through the ignition switch 14 in the Run position. The contact 30 connects the starter solenoid of the vehicle to the battery 12. The AND gate 16 is disabled until the output of the physiological tester 10 is high indicating that the operator of the vehicle has passed the test. Accordingly, the relay coil 26 is deenergized until the test is passed and the ignition switch 14 is placed in the Start position.

Figure 2:
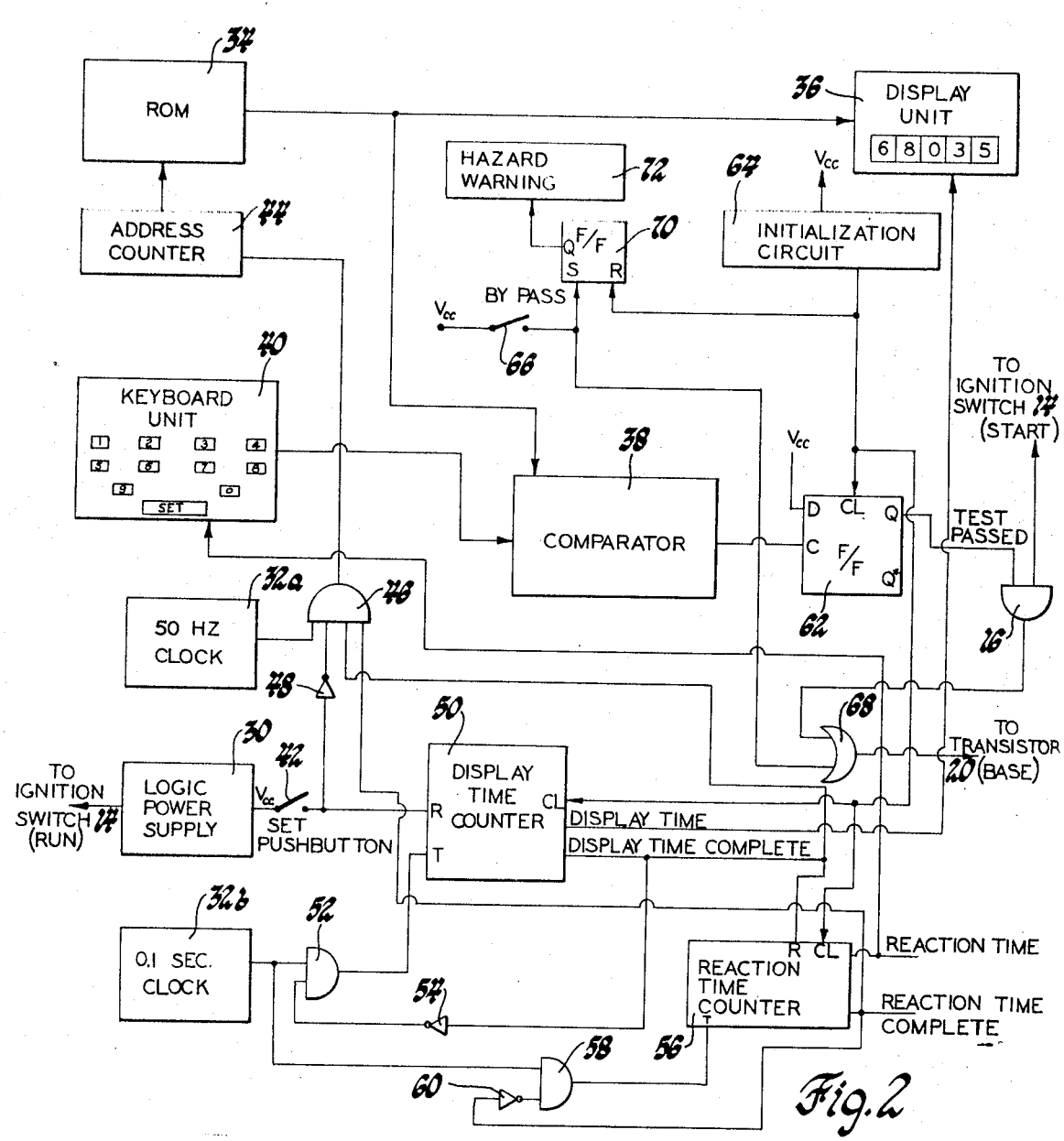
FIG. 2 is a block diagram of the physiological tester shown in FIG. 1.

Referring now to FIG. 2 the physiological tester 10 is shown in more detail to comprise a logic power supply generally designated 30 which is connected with the ignition switch 14 in the Run position and applies a voltage $V_{cc}$ to the various logic elements of the tester 10. A 50 Hz. clock 32a and a 0.1 second clock 32b provide the basic timing for the tester 10. A read-only memory (ROM) generally designated 34 provides an output which is fed to a display unit 36 and a comparator 38. The other input to the comparator 38 is from a keyboard unit generally designated 40.

The unit 36 is conventional and includes the usual decoding logic for converting binary input to decimal equivalents for display. The unit 40 includes a plurality of individually actuable pushbutton switches identifiable by the symbols 0–9 and further includes a pushbutton switch designated SET and identified by the numeral 42. The unit 40 is conventional and includes the usual logic for developing a 4 bit binary coded decimal output for each pushbutton. The ROM 34 has 64 addressable locations at each of which is stored a 20 bit binary word corresponding to a five digit number. The 64 locations in the ROM 34 are sequentially addressed by means of an address counter 44 which is advanced through outputs of 000000 to 111111 by the 50 Hz. clock 32a through an AND gate 46 which is controlled from the SET pushbutton 42 through an inverter 48. The SET pushbutton 42 of the keyboard unit 40 is connected to the reset input of a display time counter 50 which is controlled from the 0.1 second clock 32b through an AND gate 52. When the counter 50 is reset the output designated DISPLAY TIME is driven high and the output designated DISPLAY TIME COMPLETE is driven low thereby opening the gate 52 through an inverter 54 and permitting the counter 50 to be advanced.

When DISPLAY TIME is high the display unit 46 is energized and when DISPLAY TIME COMPLETE is high a reaction time counter 56 is reset causing its output designated REACTION TIME to go high and its output designated REACTION TIME COMPLETE to go low. When REACTION TIME COMPLETE goes low an AND gate 58 is opened through an inverter 60 permitting the counter 56 to be advanced by the 0.1 second clock 32b. When REACTION TIME is high the keyboard unit 40 is energized illuminating the individual pushbuttons and permitting insertion of a five digit number into the comparator 38. DISPLAY TIME COMPLETE and REACTION TIME COMPLETE also provide inputs to the AND gate 46.

The comparator 38 includes the usual Exclusive OR logic for comparing the binary input from the ROM 34 and unit 40. The comparator 38 further includes the conventional key advance means which insures a digit by digit comparison as the pushbuttons are sequentially actuated. The output of the comparator 38 is connected with the clock input of a D type flip-flop 62 having its D input connected to $V_{cc}$ and its clear input connected to an initialization circuit 64 which in turn is connected with $V_{cc}$. When the initialization circuit 64 is energized it develops a pulse which clears the flip-flop 62 causing its Q output to go low. The output of the initialization circuit 64 also clears the counters 50 and 56 placing the respective outputs DISPLAY TIME and REACTION TIME low and the respective outputs DISPLAY TIME COMPLETE and REACTION TIME COMPLETE high.

In FIG. 2, circuitry for modifying FIG. 1 to incorporate a by-pass mode of operation is shown. A bypass switch 66 is connected to $V_{cc}$ and to one input of an OR gate 68. The OR gate 68 is inserted between the gate 16 and the transistor 20 so that the transistor 20 may be rendered conductive from either the output of the gate 16 or from the bypass switch 66. The switch 66 is also connected to the SET input of a flip-flop 70 which is reset from the initialization circuit 64 and provides an output for energizing the vehicle hazard warning system generally designated 72.

The operation of the system thus far described is as follows. When the operator enters the vehicle and moves the ignition switch to the Run position, the logic power supply 30 is energized providing $V_{cc}$ to the remaining logic in the system thereby energizing the clock 32a and 32b and causing the initialization circuit 64 to produce an output pulse which clears the flip-flop 62 and the counters 50 and 56, and resets the flip-flop 70. Since the SET pushbutton 42 is open all inputs to the gate 46 are high permitting the clock 32a to advance the address counter 44 thereby sequentially addressing the 64 locations of the ROM 34. The display unit 36 is deenergized at this time since DISPLAY TIME is low. Likewise, the keyboard unit 40 is not energized since REACTION TIME is low. To initiate the physiological test the operator depresses the SET button which closes the gate 46 stopping the address counter 44 at the location in the ROM 34 being addressed at the time the SET button is actuated. Actuation of the SET button also resets the DISPLAY TIME counter 50 causing DISPLAY TIME to go high energizing the display unit 46 and displaying the number stored in the location being addressed. The 64 five digit numbers stored in the ROM 34 are selected so that entry of the number into the comparator 38 through the unit 40 requires a certain amount of manual dexterity on the part of the operator. While the number selected is limited to one of the 64 five digit numbers stored in the ROM 34, its selection is random and determined by the time of actuation of the SET pushbutton 42. Thus in contrast to the random number generators of other physiological testers such as that disclosed in Jones U.S. Pat. No. 3,610,943, assigned to the assignee of the present invention, there is no possibility of generating a relatively easy number such as one containing several repeating digits.

The number being addressed in the ROM at the time of actuation of the SET pushbutton 42 is also fed to the comparator 38. When the SET pushbutton 42 is released the gate 46 nevertheless remains closed since DISPLAY TIME COMPLETE is low. As soon as the SET button is depressed the DISPLAY TIME counter 50 is advanced by the 0.1 second clock 32b. After a predetermined interval of time determined by the counter 50 DISPLAY TIME goes low and the number displayed in the unit 36 is extinguished. When DISPLAY TIME COMPLETE goes high the reaction time counter 56 is reset causing REACTION TIME COMPLETE to go low thereby maintaining the gate 46 closed while REACTION TIME goes high energizing the keyboard unit 40 and illuminating the individual pushbuttons 0–9. When DISPLAY TIME COMPLETE goes high resetting the counter 56, the AND gate 58 is opened and the counter 56 is advanced from the 0.1 second clock 32b. During a predetermined interval of time established by the counter 56, the operator must enter through the keyboard unit 40 the number previously displayed in the display unit 36. If the number entered by the operator corresponds to the number previously displayed the output of the comparator 38 goes high clocking the flip-flop 62 and placing a high on its Q output indicative of the test having been passed. The operator may now place the ignition switch in the Start position and the transistor 20 will be rendered conductive, energizing the relay coil 26 and connecting the starter solenoid of the vehicle to the battery 12 through the contact 30 thus starting the vehicle. On the other hand, if the operator has not entered the correct number or the number is not entered within the predetermined REACTION TIME established by the counter 56 the Q output of the flip-flop 62 remains low and the relay coil 26 cannot be energized thereby inhibiting operation of the vehicle.

The physiological test may be bypassed by the operator by actuating the bypass switch 66 which renders the transistor 20 conductive through the OR gate 68. However, at the same time the flip-flop 70 is set and energizes the hazard warning system 72 of the vehicle which provides a visual and/or audible warning that the vehicle is being operated by an individual who may not be physiologically capable of operating the vehicle safely.

Figure 3:
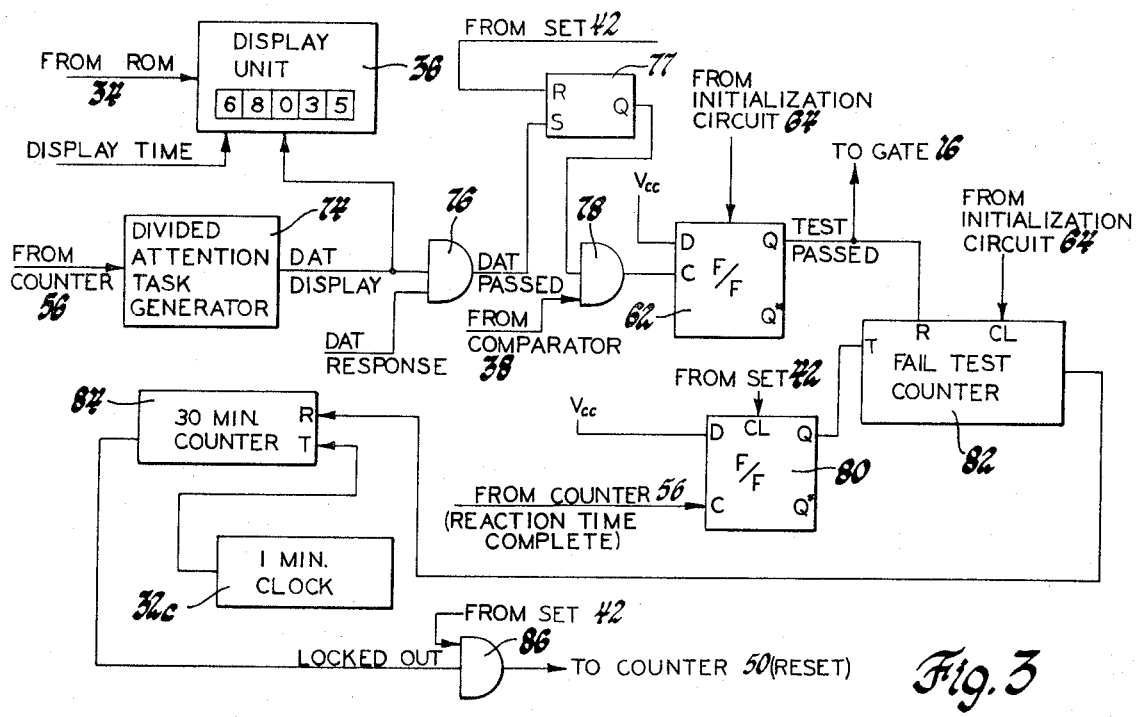
FIG. 3 is a modification of the physiological tester shown in FIG. 2 including a divided attention task feature and a lock-out feature.

Referring now to FIG. 3 the physiological tester of FIG. 2 has been modified to incorporate a divided attention task feature and a lock out feature. A divided attention task (DAT) generator generally designated 74 is energizable from the reaction time counter 56 at some selected intermediate time during REACTION TIME. The DAT generator 74 generates a signal called DAT DISPLAY for a short interval of time which is fed to the display unit 36 to instruct the operator to interrupt the entry of the displayed number into the keyboard unit 40 and to perform different tasks such as for example, actuation of the brake pedal. The DAT DISPLAY and the DAT RESPONSE are inputs to an AND gate 76 the output of which is designated DAT PASSED and is connected with the set input of a flip-flop 77. The flip-flop 77 is reset from the SET pushbutton and has its Q output connected as one input to an AND gate 78. The other input to the AND gate 78 is the output of the comparator 38. Consequently, if the DAT RESPONSE is performed by the operator while the DAT DISPLAY is high the flip-flop 77 is set driving its Q output high opening the gate 78. If the displayed number is accurately entered through the keyboard unit 40, the flip-flop 62 is clocked by the comparator 38 to switch its Q output high permitting the vehicle to be started upon closure of the ignition switch 14 to the Start position.

The lock-out feature is intended to prevent operation of the physiological tester 10 for a 30 minute interval of time if the operator unsuccessfully attempts the physiological test three consecutive times. The lock-out feature is incorporated by apparatus which includes a D type flip-flop 80 having its D input connected to $V_{cc}$. The clock input of the flip-flop 80 is driven from the REACTION TIME COMPLETE output of the reaction time counter 56. A fail test counter generally designated 82 is cleared from the initialization circuit 64 and reset each time the test is passed by the Q output of the flip-flop 62 and is advanced by the Q output of the flip-flop 80 which is driven high when REACTION TIME COMPLETE goes high. The flip-flop 80 is cleared driving its Q output low each time the SET pushbutton 42 is actuated. If the fail test counter 82 is advanced three times without being cleared a thirty minute counter generally designated 84 is reset causing its output designated LOCKED OUT to go low. The counter 84 is then advanced from a one minute clock generally designated 32c so that its output does not go high again for 30 minutes. The output of the counter 84 is fed to an AND gate 86 which is inserted in the line between the SET pushbutton 42 and the reset terminal of the display time counter 50. Consequently, until the thirty minute period has elapsed, the gate 86 is closed and the display time counter 50 cannot be reset thereby maintaining DISPLAY TIME low and preventing any display on the unit 36.

Figure 4:
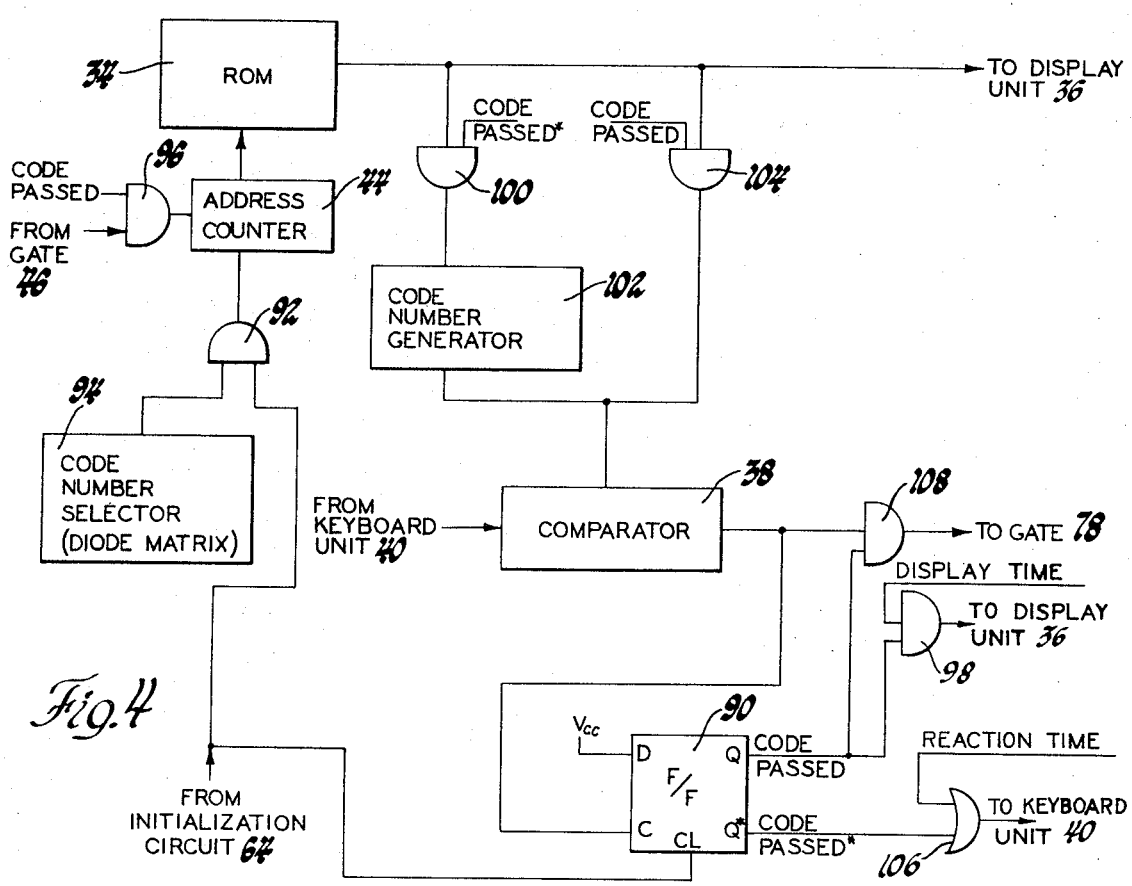
FIG. 4 is a modification of the physiological tester of FIGS. 2 and 3 to incorporate an anti-theft feature.

Referring now to FIG. 4, the physiological tester of FIG. 2 as modified by FIG. 3 has been further modified to incorporate an anti-theft feature. The anti-theft feature is implemented by apparatus which includes a D type flip-flop 90 which is cleared from the initialization circuit 64 upon actuation of the ignition switch to the Run position placing its Q output designated CODE PASSED low and its Q* output designated CODE PASSED* high. The initialization circuit 64 also enables an AND gate 92 which permits a code number selector generally designated 94 to jam the address counter 44 so that a particular location in the ROM 34, such as 000000, is addressed. The code number selector 94 may be a diode matrix which is programmed to jam the counter 36 to one of the 64 locations in the ROM 34 from 000000 to 111111. An AND gate 96 is interposed between the AND gate 46 and the counter 44 and is closed during the time the address counter is being jammed, since one input to the gate 96 is CODE PASSED which during jamming is low. An AND gate 98 is interposed between the counter 50 and the display unit 50 and is closed until the Q output of the flip-flop 90 goes high indicating that the code has been passed. Accordingly, the particular number located in address 000000 is not displayed on the display unit 50 at this time. Nor can any subsequent number be displayed until the code number has been correctly entered through the keyboard unit 40. The output of the ROM 34 is fed through an AND gate 100 which is opened by the high at the Q* output of the flip-flop 90, to a code number generator generally designated 102 which inverts the least significant bit of each of the five binary coded decimal digits and feeds this modified number to the comparator 38. An AND gate 104 which is closed by CODE PASSED being low is connected in parallel with the gate 100 and the generator 102. While the code number generator 102 is not essential to the apparatus it permits modification of a number stored in the ROM 34 so that the lock number is not one of those normally displayed on the display unit 50. The REACTION TIME input to the keyboard unit 40 is OR'ed with CODE PASSED* in an OR gate 106 so that the keyboard unit is energized and any operator entry is fed to the comparator 38. If the operator now enters the correct code number to the comparator 38 the flip-flop 90 is clocked so that its Q output goes high and its Q* output goes low indicating that the code has been passed. This opens the gates 96, 98, and 104 and closes the gate 100 permitting the address counter 36 to begin sequential address of the 64 locations in the ROM 34. An AND gate 108 interposed between the comparator 38 and the AND gate 78 (FIG. 3) is also opened to permit any subsequent high output from the comparator 38 to pass to the gate 78. Upon actuation of the SET pushbutton 42 the five digit number stored in the particular location being addressed in the ROM 34 at the time of actuation of the pushbutton 42 is displayed on the display unit 54 for the predetermined DISPLAY TIME and is fed to the comparator 38, since both AND gates 98 and 104 are opened from the Q output of the flip-flop 90. When the anti-theft feature of FIG. 4 is included in the overall system it is preferable that the bypass apparatus of FIG. 2 be modified so that bypass of the tester 10 is permitted only if the proper code number is entered. This is readily accomplished by disconnecting the bypass switch 66 from $V_{cc}$ as shown in FIG. 2 and connecting the switch 66 to the Q output of flip-flop 90. With this modification the bypass of the tester 10 is inhibited until CODE PASSED goes high upon entry of the proper code.

Briefly summarizing the operation of the system as shown in FIGS. 1 through 4; upon placing the ignition switch in the Run position the code number is fed to the comparator 38 and must be entered by the operator through the keyboard unit 40 before the physiological test can be performed. If the proper code number is entered sequential addressing of the ROM commences. Upon actuation of the SET pushbutton, one of the 64 five digit numbers is displayed for a fixed interval of time on the display unit 36. After this time interval the unit 36 is disabled and the number previously displayed must be entered by the operator through the unit 40 within a predetermined time. During this time interval the operation is commanded from the DAT generator 74 to actuate the brake pedal and then return to entering the five digit number. If the DAT is performed during the DAT DISPLAY time and the correct five digit number is entered the vehicle may be started. Three consecutive failures by the operator prevents illumination of the display unit 50 and consequently, prevents operation of the vehicle for a thirty minute time interval. At any time after the code number has been entered the tester 10 may be bypassed to start the vehicle, however, the hazard warning circuit 72 of the vehicle will be energized.

Having thus described my invention what I claim is:
1. Apparatus for preventing operation of a motor vehicle by an incapacitated person comprising:
random word generating means including a read-only memory containing a plurality of addressable locations, each location storing a word containing a plurality of known symbols, memory address means for sequentially addressing the words stored in said locations,
operator actuable input means including first switch means coupled with said memory address means for interrupting the sequential addressing of said memory to thereby select the word stored in the location being addressed at the time of operator actuation of said first switch means,
display means coupled with said generating means for displaying the word selected for a first predetermined interval of time, said operator actuable input means further including a plurality of individually actuable switch means each of which is identifiable by a symbol corresponding to a different one of the symbols contained in said words, means for enabling said individually actuable switch means for a second predetermined interval of time following said first predetermined interval of time, comparator means coupled with said generating means and said operator actuable input means for comparing the word selected with the word entered through said operator actuable input means by said vehicle operator, and control means coupled with said comparator means for permitting vehicle operation only if the word entered through said operator actuable input means corresponds to the word displayed.

2. Apparatus as claimed in claim 1 further including means coupled with said memory address means for forcing said address means to address a predetermined location in said memory means, and second control means responsive to the output of said comparator means for disabling said display means and said first mentioned control means until the word stored in said predetermined location is entered by said operator through said operator-actuable input means.

3. Apparatus as claimed in claim 1 further including means responsive to actuation of said first switch means a predetermined number of times for disabling said display means for a predetermined interval of time.

4. Apparatus as claimed in claim 1 further including means coupled with said display means for instructing the operator to interrupt the entry of a word through said operator-actuable input means and to perform an unrelated task, and means for inhibiting said first mentioned control means unless said task is performed.

5. Apparatus as claimed in claim 1 further including additional switch means for bypassing said first mentioned control means to permit vehicle operation, and warning means energizable in response to actuation of said additional switch means.

6. Motor vehicle operation control apparatus comprising read-only memory means containing a plurality of addressable locations, each location storing a multi-digit number, memory address means coupled with said memory means for sequentially addressing said locations, keyboard input means including pushbutton switch means identifiable with the digits of said numbers, display means coupled with said memory means, comparator means coupled with said memory means and said input means for comparing a number stored in said memory means with a number entered through said input means, means coupled with said memory address means for jamming said address means to a predetermined location in said memory means, first control means for disabling said display means during jamming of said address means to prevent display of the number stored in said predetermined location, said first control means responsive to the output of said comparator means for terminating jamming of said address means and permitting sequential addressing of said memory means upon entry through said input means of the number stored in said predetermined location, said input means including additional switch means coupled with said memory address means for interrupting the sequential addressing of said memory to thereby select the number stored in the location being addressed at the time of operator actuation of said additional switch means, said first control means responsive to actuation of said additional switch means to energize said display means and display the number selected for a predetermined interval of time and thereafter de-energize said display means and energize said input means for a second predetermined interval of time, second control means responsive to the output of said comparator means for permitting vehicle operation only if the word entered through said input means corresponds to the word previously displayed on said display means.

7. The apparatus defined in claim 6 further including bypass switch means for bypassing said second control means in response to entry of the word stored in said predetermined location, and warning means energizable in response to actuation of said bypass switch means.

* * * * *